(12) United States Patent
Grashof

(10) Patent No.: US 10,712,216 B2
(45) Date of Patent: Jul. 14, 2020

(54) METHOD AND APPARATUS FOR ESTIMATING TORQUE

(71) Applicant: Fluke Precision Measurement Limited, Norwich (GB)

(72) Inventor: Gerardus Hermanus Bernardus Grashof, EA Almelo (NL)

(73) Assignee: Fluke Precision Measurement Limited, Norwich (GB)

(*) Notice: Subject to any disclaimer, the term of this patent is extended or adjusted under 35 U.S.C. 154(b) by 587 days.

(21) Appl. No.: 14/919,547

(22) Filed: Oct. 21, 2015

(65) Prior Publication Data
US 2016/0116354 A1     Apr. 28, 2016

(30) Foreign Application Priority Data
Oct. 23, 2014   (EP) .................................. 14199048

(51) Int. Cl.
*G01L 5/00*     (2006.01)
*H02P 21/20*    (2016.01)
(Continued)

(52) U.S. Cl.
CPC ................. *G01L 5/00* (2013.01); *G01L 3/02* (2013.01); *H02P 21/20* (2016.02); *H02P 23/14* (2013.01)

(58) Field of Classification Search
CPC .......... H02P 21/20; H02P 21/14; H02P 23/14; G01L 5/00; G01L 3/00; G01L 3/24
See application file for complete search history.

(56) References Cited

U.S. PATENT DOCUMENTS

| 5,057,760 A | 10/1991 | Dadpey et al. |
| 6,505,132 B1 | 1/2003 | Takaku |

(Continued)

FOREIGN PATENT DOCUMENTS

| CN | 86 1 01150 A | 10/1986 |
| CN | 1067744 A | 1/1993 |

(Continued)

OTHER PUBLICATIONS

Kral, C., et al. "Detection of mechanical imbalances during transient torque operating conditions", Diagnostics for Electric Machines, Power Electronics and Drives 2005, SDEMPED 2005. 5th IEEE International Symposium on, IEEE, Piscataway, NJ, USA, Sep. 7, 2005 (Sep. 7, 2005). pp. 1-4.

(Continued)

*Primary Examiner* — Leslie J Evanisko
*Assistant Examiner* — Leo T Hinze
(74) *Attorney, Agent, or Firm* — Seed Intellectual Property Law Group LLP

(57) ABSTRACT

A method of estimating the torque of an axle of a running motor, comprising receiving data indicative of the total electrical active power, P, supplied to the motor, determining the electromechanical power, $P_{em}$, supplied to the axle using the data indicative of the total electrical active power, P, receiving data indicative of a rotor speed, $n_r$, or rotor frequency, $f_r$, of the axle, determining an angular rotor frequency, $\omega_r$, of the axle using the data indicative of rotor speed, $n_r$, or rotor frequency, $f_r$, of the axle, and determining electromechanical axle torque, $T_{em}$, using the determined electromechanical power, $P_{em}$, and the determined angular rotor frequency, $\omega_r$.

17 Claims, 3 Drawing Sheets

(51) Int. Cl.
*H02P 23/14* (2006.01)
*G01L 3/02* (2006.01)

(56) References Cited

U.S. PATENT DOCUMENTS

| | | | |
|---|---|---|---|
| 8,473,228 B2 * | 6/2013 | Tiwari | ............... H02P 29/0241 |
| | | | 324/545 |
| 8,766,578 B2 | 7/2014 | Aghili | |
| 9,109,517 B2 * | 8/2015 | Banerjee | ................ F01D 15/10 |
| 2010/0169030 A1 * | 7/2010 | Parlos | .................... G01H 1/00 |
| | | | 702/58 |
| 2012/0239348 A1 | 9/2012 | Banerjee et al. | |

FOREIGN PATENT DOCUMENTS

| | | |
|---|---|---|
| CN | 101788604 A | 7/2010 |
| JP | 2007-222918 A | 9/2007 |

OTHER PUBLICATIONS

Extended EP Search Report for EP 14190048.0, dated Apr. 10, 2015, 7 pages.

First Office Action for Chinese Application No. 201510692241.1, dated Jan. 28, 2019, 17 pgs.

\* cited by examiner

METHOD AND APPARATUS FOR ESTIMATING TORQUE

This present disclosure relates to a method and apparatus for estimating torque, and, in particular, to a method and apparatus for estimating the torque of an axle of a running motor.

BACKGROUND

In many applications, it is useful to know the torque of a running motor. One known method of measuring torque involves the use of one or more sensors mechanically coupled to a motor shaft. However, there are certain drawbacks associated with the use of torque measuring sensors. In particular, the sensors need to be built into the rotating equipment which is often mechanically difficult, impractical, or, simply, impossible. In certain applications, the presence of the sensor in the mechanical system can interfere with the motor's operation. For example, in high-speed spindle applications, mechanical sensors can introduce an imbalance into the system (in addition to other issues). Additionally, torque sensors are often expensive.

It is also known to use indirect measurements to determine torque. For example, the "Steinmetz equivalent circuit" may be used to describe how an induction motor's electrical input is transformed into useful mechanical energy output. The parameters of the Steinmetz equivalent circuit can be obtained by starting the motor in a "no load" condition and in a "locked rotor" condition. However, both conditions are disruptive to normal operation of the motor since they each require the motor to be in a non-running state.

Another method of obtaining the Steinmetz equivalent circuit parameters is based on analysis of the motor start-up current by digital signal processing (DSP) analysis. This method involves a learning period for each individual motor and also requires an interruption of the normal operation of the motor system.

U.S. Pat. No. 6,505,132 (Takaku) describes a detection device for detecting instantaneously generated torque and an average generated torque of a three-phase motor. In advance of determining the instantaneously generated torque, the described device is required to detect a "no load" current of the motor.

There therefore exists a need for a method and/or apparatus for estimating the torque of a running motor which does not interfere with the operation of the motor.

It is an object of certain embodiments of the present disclosure to overcome at least some disadvantages associated with the prior art.

BRIEF SUMMARY OF THE DISCLOSURE

Aspects of the present invention are defined in the appended claims.

In accordance with a first aspect disclosed herein, there is provided a method of estimating the torque of an axle of a running motor, comprising:

receiving data indicative of the total electrical active power, P, supplied to the motor;
determining the electromechanical power, $P_{em}$, supplied to the axle using the data indicative of the total electrical active power, P;
receiving data indicative of a rotor speed, $n_r$, or rotor frequency, $f_r$, of the axle;
determining an angular rotor frequency, $\omega_r$, of the axle using the data indicative of the rotor speed, $n_r$, or rotor frequency, $f_r$, of the axle; and
determining electromechanical axle torque, $T_{em}$, using the determined electromechanical power, $P_{em}$, and the determined angular rotor frequency, $\omega_r$.

Data indicative of the total electrical active power, P, supplied to the motor may be obtained by measuring the total electrical active power, P, supplied to the motor. Measuring the total electrical active power, P, supplied to the motor may include measuring one or both of an instantaneous motor voltage and an instantaneous motor current on each connected phase of the motor.

Receiving data indicative of the total electrical active power, P, may include receiving data indicative of one or more frequency components, $P_1, P_2, P_3, P_4, \ldots$, of the total electrical active power, P, and receiving data indicative of symmetrical components, $P^+, P^-$, of the fundamental frequency component, $P_1$. Data indicative of one or more frequency components, $P_1, P_2, P_3, P_4, \ldots$, of the total electrical active power, P, may be obtained by Fourier analysis of total electrical active power, P, and/or data indicative of symmetrical components, $P^+, P^-$, of the fundamental frequency component, $P_1$, may be obtained by symmetrical decomposition of the fundamental frequency component, $P_1$.

Receiving data indicative of a rotor speed, $n_r$, or rotor frequency, $f_r$, of the axle may include receiving data indicative of one or more of the fundamental electrical frequency, $f_1$, of the current supplied to the motor, the load dependent slip, s, of the motor, the frequency shift, $\Delta f$, due to rotor slip, and the number of poles, p, of the motor. The method may further include the step of determining the rotor speed, $n_r$, or rotor frequency, $f_r$, of the axle, where $f_r$ (Hz)=$(1-s) \cdot f_s$=$(1-s) \cdot 2 \cdot f_1/p$=$n_r$(rpm)/60, and $f_s$ is the synchronous frequency of the motor. Additionally or alternatively, the method may further include the step of determining the number of poles, p, of the motor, where p=INTEGER$((120 \cdot f_{nom})/n_{nom})$, where $n_{nom}$ is the nominal speed of the motor operating at its nominal frequency, $f_{nom}$.

The method may further include the step of determining the load dependent slip, s, by analysis of a frequency spectrum of the current supplied to the motor.

The frequency shift, $\Delta f$, due to rotor slip, and the fundamental electrical frequency, $f_1$, of the current supplied to the motor may be determined from the frequency spectrum of the current supplied to the motor, and the load dependent slip, s, is determined as s=$2 \cdot \Delta f/f_1$.

The method may further comprise the step of creating a frequency spectrum of the current supplied to the motor.

The angular rotor frequency, $\omega_r$, of the axle may be determined by calculating $\omega_r$ (rad/s)=$2 \cdot \pi \cdot f_r$=$4 \cdot \pi \cdot (1-s) \cdot f_1/p$.

The electromechanical axle torque, $T_{em}$, may be determined by calculating $T_{em}$=$P_{em}/\omega_r$.

The motor may be an asynchronous induction motor.

In accordance with a second aspect of the present disclosure, there is provided an apparatus configured to carry out any of the methods described above in relation to the first aspect of the present disclosure.

BRIEF DESCRIPTION OF THE DRAWINGS

Embodiments of the disclosure are further described hereinafter with reference to the accompanying drawings, in which.

DETAILED DESCRIPTION

Embodiments of the present disclosure provide a method and apparatus for estimating the torque of an axle of a running motor. Advantageously, the method and apparatus may be used to estimate torque without interrupting operation of the motor.

Figure 1:
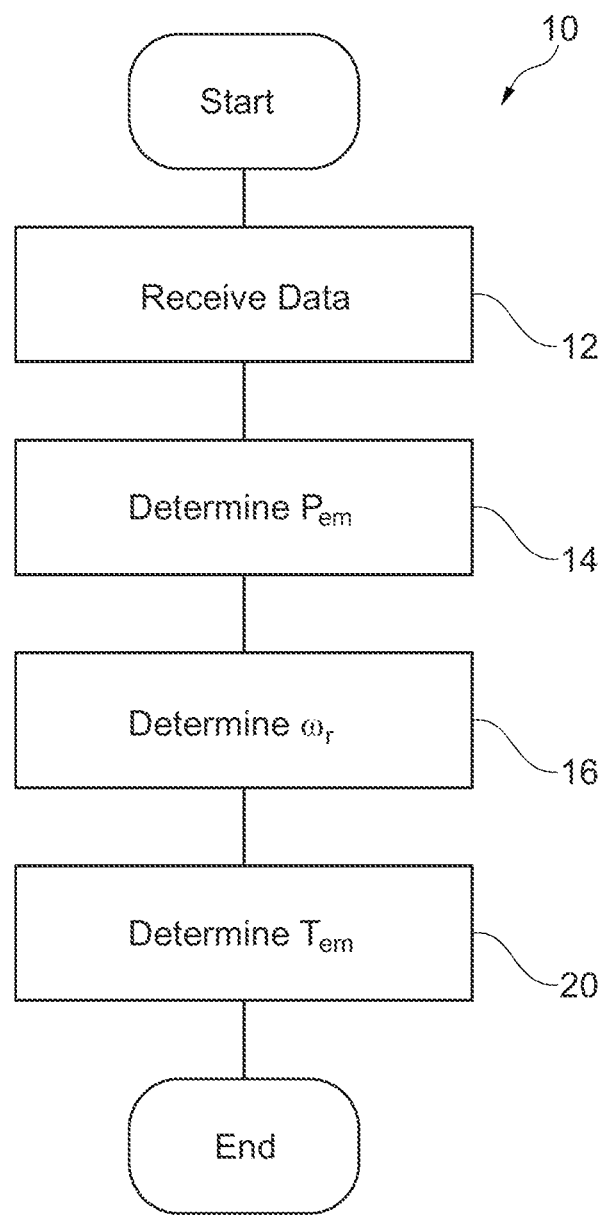
FIG. 1 shows a method according to an embodiment of the present disclosure.

FIG. 1 illustrates a method 10 of determining the electromechanical torque, $T_{em}$, of an axle of a running motor.

Figure 2:
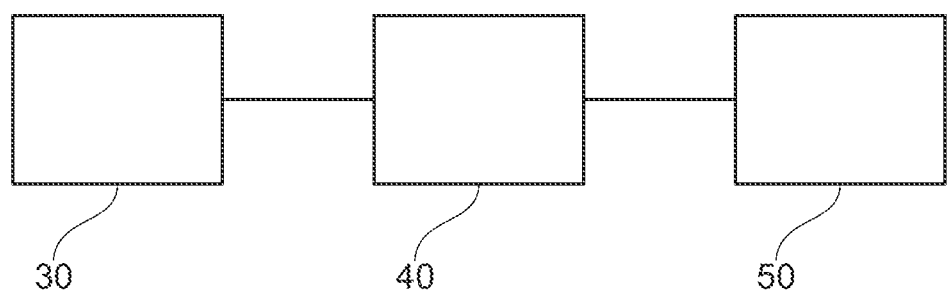
FIG. 2 shows a schematic diagram of an apparatus according to an embodiment of the present disclosure.

The method 10 may be performed by an apparatus 40 as illustrated in FIG. 2. The apparatus 40 may be positioned between a power source 30 and a motor 50.

Returning to FIG. 1, the method 10 comprises a step 12 of receiving data that is indicative of the total electrical active power, P, supplied to the motor 50 by the power source 30. Additionally at step 12, data is received that is indicative of a rotor speed, $n_r$, or rotor frequency, $f_r$, of the axle. At step 14, the electromechanical power, $P_{em}$, supplied to an axle of the motor 50 is determined using the data indicative of the total electrical active power, P. Additionally, at step 16, the angular rotor frequency, $\omega_r$, of the axle is determined using the data indicative of rotor speed, $n_r$, or rotor frequency, $f_r$, of the axle. Using the determined electromechanical power, $P_{em}$, and the determined angular rotor frequency, $\omega_r$, the electromechanical axle torque, $T_{em}$, is determined at step 20.

Therefore, the electromechanical axle torque, $T_{em}$, is estimated using only data relating to the total electrical active power, P, supplied to the motor 50 by the power source and the rotor speed, $n_r$, or rotor frequency, $f_r$, of the axle. Advantageously, this data may be received without interrupting the operation of the motor 50.

In at least one embodiment, data indicative of the total electrical active power, P, supplied to the motor 50 is obtained by measuring the total electrical active power, P, supplied to the motor 50. For example, the total electrical active power, P, supplied to the motor 50 may be determined by measurement of the instantaneous motor voltage and instantaneous motor current on each connected phase of the motor 50. In particular, the total electrical active power, P, supplied to the motor 50 may be derived using the measured voltages and currents. For example, the voltage and/or current may be measured in accordance with IEC 61000-4-30 which is incorporated herein by reference, and/or the total electrical active power, P, may be calculated in accordance with IEEE Std 1459 which is also incorporated herein by reference.

The mechanical power at the axle of a motor arises due to the electrical active power, P, supplied to the motor. However, not all electrical active power, P, is converted into mechanical power. The total electrical active power may therefore be decomposed into three categories, namely (i) electrical active power components positively contributing to mechanical power, (ii) electrical active power negatively contributing to mechanical power, and (iii) electrical active power components not contributing to mechanical power.

The total electrical active power, P, may be decomposed into its individual frequency components. For example, this decomposition may be achieved by Fourier analysis. In a particularly preferable embodiment, this decomposition may be achieved by a fast Fourier transform (FFT) in accordance with the standard IEC 61000-4-7 which is incorporated herein by reference. Once decomposed, the total electrical active power, P, may be expressed as a series of harmonic components:

$$P=P_1+P_2+P_3+P_4\ldots+P_N,$$

where $P_1$ is the power supplied by the fundamental frequency of the electrical voltage connected to the motor and $P_N$ is the power supplied by the Nth harmonic component of this fundamental frequency. The fundamental frequency is typically the mains frequency (e.g. 50 Hz or 60 Hz), however, in the case of electronic variable speed drive circuits, the fundamental frequency may be a varying frequency.

The fundamental component $P_1$ may be further decomposed into its symmetrical components using the established method symmetrical decomposition (originally proposed by C. L. Fortescue). In particular, the fundamental component P1 may be decomposed as follows:

$$P_1=P^++P^-+P^0,$$

where $P^+$ is the positive sequence power, $P^-$ is the negative sequence power and $P^0$ is the zero sequence power as described by Fortescue.

Substituting this expression for P1 into the decomposed series for total active electrical power, P, and terminating the series at the $25^{th}$ harmonic component gives:

$$P=P^++P^-+P^0+(P_2+P_3+P_4\ldots+P_{25}).$$

As noted above, it is understood that certain terms of this expression provide a positive contribution to the mechanical power at the axle, whilst certain terms provide a negative contribution or do not contribute at all. For example, the fundamental wave revolves synchronously at the synchronous speed, $n_s$, whereas the $3^{rd}$, $5^{th}$, $7^{th}$ ... harmonics may rotate in the forward or backward direction at speeds of $n_s/3$, $n_s/5$, $n_s/7$, ..., respectively. Even harmonics do not contribute to torque. The following table demonstrates how certain harmonics contribute positively or negatively (or not at all) to the torque (in respect of odd harmonics up to the $25^{th}$).

| Harmonic | Total phase shift (degrees) | Nearest whole cycle (degrees) | Effective phase shift | Torque |
|---|---|---|---|---|
| 1 | 120 | 0 | +120 | Pos |
| 3 | 360 | 360 | 0 | n/a |
| 5 | 600 | 720 | −120 | Neg |
| 7 | 840 | 720 | +120 | Pos |
| 9 | 1080 | 1080 | 0 | n/a |
| 11 | 1320 | 1440 | −120 | Neg |
| 13 | 1560 | 1440 | +120 | Pos |
| 15 | 1800 | 1800 | 0 | n/a |
| 17 | 2040 | 2160 | −120 | Neg |
| 19 | 2280 | 2160 | +120 | Pos |
| 21 | 2520 | 2520 | 0 | n/a |
| 23 | 2760 | 2880 | −120 | Neg |
| 25 | 3000 | 2880 | +120 | Pos |

Considering the above, the following relationships apply (considering a limited series):

Positive contribution: $P_{pos}=P^++P_7+P_{13}+P_{19}$;

Negative contribution: $P_{neg}=P^-+P_5+P_{11}+P_{17}+P_{23}$;

No contribution: all remaining power components.

The power components not contributing to the mechanical power at the axle may, for example, generate heat, noise or mechanical malfunction, but contribute neither positively nor negatively to the mechanical power supplied to the axle.

The electromechanical power, $P_{em}$, may be expressed as:

$$P_{em}=P_{pos}-P_{neg}=P^+ + P_7 + P_{13} + P_{19} - P^- - P_5 - P_{11} - P_{17} - P_{23}.$$

Therefore, one method for determining the electromechanical power, $P_{em}$, is to measure or otherwise obtain data indicative of the total electrical active power, P, supplied to the axle (e.g., by measuring the instantaneous voltage and current as described above), and then decomposing the total active power, P, to obtain the components required to determine $P_{em}$. Any method or apparatus in which data that is indicative of the total electrical active power, P, is received and then used to determine electromechanical power, $P_{em}$, may be used within the scope of the present disclosure.

As described above, step 12 also includes receiving data that is indicative of a rotor speed, $n_r$, or rotor frequency, $f_r$, of the axle ($n_r$ (rpm)=60·$f_r$ (Hz)). The rotor speed, $n_r$, may be expressed as:

$$n_r=(1-s)\cdot n_s,$$

where s is the load dependent slip of the motor and $n_s$ is the synchronous speed (i.e., the speed that the motor would run at without slip). Similarly, the rotor frequency, $f_r$, may be expressed as:

$$f_r=(1-s)\cdot f_s,$$

where $f_s$ is the synchronous frequency, and $n_s$ (rpm)=60·$f_s$ (Hz). Therefore, the rotor speed, $n_r$, or rotor frequency, $f_r$, of the axle may be ascertained by receiving data indicative of the slip, s, and the synchronous speed, $n_s$, or frequency, $f_s$. The synchronous speed, $n_s$, may be expressed as:

$$n_s=(120\cdot f_1)/p,$$

where $f_1$ is the fundamental electrical frequency, and p is the number of motor poles. Similarly, the synchronous frequency, $f_s$, may be expressed as:

$$f_s=2\cdot f_1/p.$$

Therefore, the rotor speed, $n_r$, or rotor frequency, $f_r$, of the axle may be ascertained by receiving data indicative of the slip, s, the fundamental electrical frequency, $f_1$, and the number of poles of the motor, p.

The number of motor poles, p, can be deduced from the nominal speed $n_{nom}$ of the motor at the nominal frequency $f_{nom}$, (which is usually 50 Hz or 60 Hz) by the expression:

$$p=\text{INTEGER}((120\cdot f_{nom})/n_{nom}),$$

where the INTEGER function truncates the result.

The nominal speed $n_{nom}$ and nominal frequency $f_{nom}$, are quantities defined on the motor nameplate (also known as the motor type shield or motor rating plate) found on most, if not all, motors (typically listed simply as "speed" and "frequency").

Figure 3:
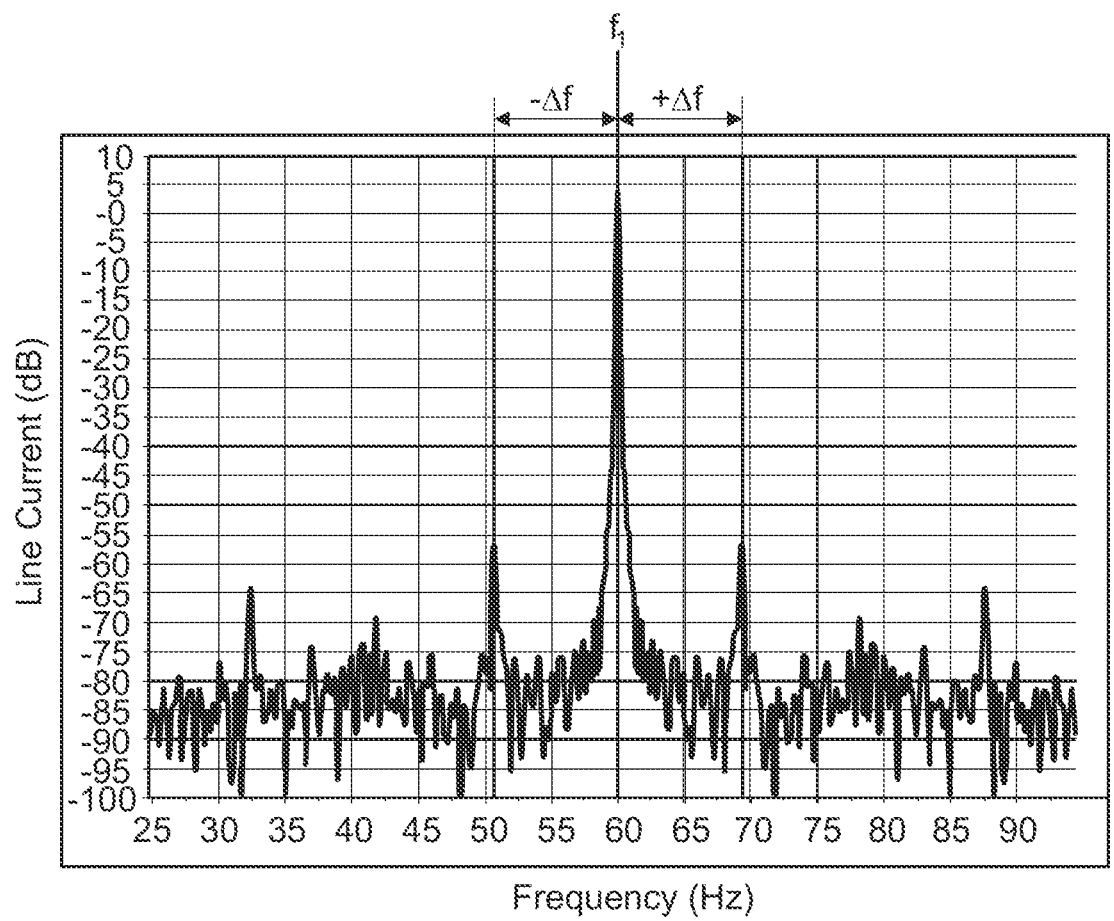
FIG. 3 shows a frequency spectrum associated with the motor current.

If the load dependent slip, s, is unknown, it may be calculated using the expression:

$$s=2\cdot \Delta f/f_1,$$

where $\Delta f$ is the frequency shift due to rotor slip. $\Delta f$ (and $f_1$, if unknown) can be obtained by analysis of the frequency spectrum of the motor current. FIG. 3 shows an example of a motor current frequency spectrum where the fundamental frequency, $f_1$, is 60 Hz. On either side of the fundamental frequency, $f_1$, there is a notable sideband frequency that is shifted relative to the fundamental frequency, $f_1$, by $\pm\Delta f$. Thus, analysis of the frequency spectrum can provide the value of $\Delta f$. In order to successfully derive $\Delta f$ from a measured frequency spectrum, the resolution of the frequency spectrum should be sufficiently great. In certain preferable embodiments, a resolution of 0.1 to 0.5 Hz is sufficient. Also, given that the sideband signals may be significantly lower than the signal at the fundamental frequency, $f_1$, the frequency spectrum is preferably obtained with a sufficiently great dynamic range to permit the sidebands to be accurately identified. In the example shown in FIG. 3, the sidebands are approximately 60 dB lower than the fundamental component, $f_1$.

Considering the above expression for the rotor frequency, $f_r$, and substituting the expression for the synchronous frequency, $f_s$, provides:

$$f_r=(1-s)\cdot 2\cdot f_1/p.$$

Given that the angular rotor frequency, $\omega_r$, is defined as $\omega_r=2\cdot\pi\cdot f_r$, it may be expressed (in rad/s) as:

$$\omega_r=2\cdot\pi\cdot(1-s)\cdot 2\cdot f_1/p.$$

Therefore, simply by analyzing the motor current frequency spectrum and obtaining data indicative of the nominal speed $n_{nom}$ and nominal frequency $f_{nom}$ of the motor (which may be readily obtained from the motor nameplate), the angular rotor frequency, $\omega_r$, may be determined.

Once the electromechanical power, $P_{em}$, and the angular rotor frequency, $\omega_r$, is determined, the electromechanical axle torque, $T_{em}$, of the motor can be calculated using the expression:

$$T_{em}=P_{em}/\omega_r.$$

Certain methods according to embodiments of the present disclosure are particularly suited to calculating electromechanical axle torque in asynchronous motors. The skilled person will appreciate that for synchronous motors, the effects of slip will not apply.

Certain embodiments of the present disclosure comprise apparatus that is configured to carry out the method. Returning to FIG. 2, the apparatus 40 may be any suitable apparatus for obtaining the required data and determining electromechanical axle torque, $T_{em}$, in accordance with methods according to embodiments of the present disclosure. The apparatus 40 may include any suitable means, sensor, or system for measuring the instantaneous voltage and current on each connected phase of the motor 50. The apparatus 40 may include a control means in the form of a control unit that comprises one or more processors for executing computer software instructions that may be arranged, when executed, to perform a method according to an embodiment of the present disclosure. The software instructions may be stored in a non-transitory computer-readable medium, such as a memory of the control unit. The control unit may be communicably coupled to the means, sensor or system (if present) for measuring the instantaneous voltage and current on each connected phase of the motor 50. The apparatus 40 may include a display for displaying information, which may include, for example, the calculated electromechanical axle torque, $T_{em}$. The apparatus may include one or more transmitters and/or receivers for transmitting and/or receiving data. For example, the apparatus 40 may be configured to transmit data indicative of the electromechanical axle torque, $T_{em}$.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example disclosed herein are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A processor-implemented method of estimating and communicating the torque of an axle of a running motor, comprising:

obtaining, by a control unit comprised of one or more processors, data indicative of a total electrical active power, P, supplied to the motor, by measuring the total electrical active power, P, supplied to the motor;

decomposing, by the control unit, the total electrical active power, P, into a fundamental frequency component, $P_1$, and harmonic frequency components;

decomposing, by the control unit, the fundamental frequency component, $P_1$, into symmetrical components including at least a positive sequence power component, $P^+$, and a negative sequence power component, $P^-$;

determining, by the control unit, an electromechanical power, $P_{em}$, supplied to the axle using the data indicative of the total electrical active power, P, by subtracting a sum of the negative sequence power component, $P^-$, and harmonic frequency components that provide a negative contribution to mechanical power at the axle from a sum of the positive sequence power component, $P^+$, and harmonic frequency components that provide a positive contribution to mechanical power at the axle;

determining, by the control unit, a rotor speed, $n_r$, or rotor frequency, $f_r$, of the axle based on data indicative of a load dependent slip, s, and a synchronous speed, $n_s$, or synchronous frequency, $f_s$, of the motor;

determining, by the control unit, an angular rotor frequency, $\omega_r$, of the axle using the data indicative of the rotor speed, $n_r$, or rotor frequency, $f_r$, of the axle;

determining electromechanical axle torque, $T_{em}$, using the determined electromechanical power, $P_{em}$, and the determined angular rotor frequency, $\omega_r$; and outputting, by the control unit, a signal indicative of the determined electromechanical axle torque, $T_{em}$.

2. The method according to claim 1, wherein measuring the total electrical active power, P, supplied to the motor includes measuring one or both of an instantaneous motor voltage and an instantaneous motor current on each connected phase of the motor.

3. The method of claim 1, wherein the fundamental and harmonic frequency components of the total electrical active power, P, are obtained by Fourier analysis of total electrical active power, P.

4. The method of claim 1, wherein determining the rotor speed, $n_r$, or rotor frequency, $f_r$, of the axle includes receiving data indicative of one or more of the fundamental electrical frequency, $f_1$, of the current supplied to the motor, the load dependent slip, s, of the motor, the frequency shift, $\Delta f$, due to rotor slip, and the number of poles, p, of the motor.

5. The method of claim 4, wherein the rotor speed, $n_r$, or rotor frequency, $f_r$, of the axle is determined where $f_r(Hz)= (1-s)\cdot f_s, =(1-s)\cdot 2\cdot f_1/p =n_r(rpm)/60$, and $f_s$ is the synchronous frequency of the motor.

6. The method of claim 4, wherein the method further includes determining the number of poles, p, of the motor, where p =INTEGER($(120\cdot f_{nom})/n_{nom}$), where $n_{nom}$ is the nominal speed of the motor operating at its nominal frequency, $f_{nom}$.

7. The method of claim 6, wherein the method further includes determining the load dependent slip, s, by analysis of a frequency spectrum of the current supplied to the motor.

8. The method of claim 7, wherein the frequency shift, $\Delta f$, due to rotor slip, and the fundamental electrical frequency, $f_1$, of the current supplied to the motor are determined from the frequency spectrum of the current supplied to the motor, and the load dependent slip, s, is determined as $s=2\cdot \Delta f/f_1$.

9. The method of claim 7, wherein the method further comprises creating a frequency spectrum of the current supplied to the motor.

10. The method of claim 4, wherein the angular rotor frequency, $\omega_r$, of the axle is determined by calculating $\omega_r (rad/s)=2\cdot \pi \cdot f_r=4\cdot \pi \cdot (1-s)\cdot f_1/p$.

11. The method of claim 1, wherein the electromechanical axle torque, $T_{em}$, is determined by calculating $T_{em}=P_{em}/\omega_r$.

12. The method of claim 1, wherein the motor is an asynchronous induction motor.

13. The method of claim 1, wherein the positive and negative sequence power components, $P^+$, $P^-$, of the fundamental frequency component, $P_1$, are obtained by symmetrical decomposition of the fundamental frequency component, $P_1$.

14. An apparatus configured to estimate and communicate the torque of an axle of a running motor, the apparatus comprising one or more processing components configured to:

obtain data indicative of a total electrical active power, P, supplied to the motor, wherein the total electrical active power, P, supplied to the motor is derived from measurement of voltage and current supplied to the motor;

decompose the total electrical active power, P, into a fundamental frequency component, $P_1$, and harmonic frequency components;

decompose the fundamental frequency component, $P_1$, into symmetrical components including at least a positive sequence power component, $P^+$, and a negative sequence power component, $P^-$;

determine an electromechanical power, $P_{em}$, supplied to the axle using the data indicative of the total electrical active power, P, by subtracting a sum of the negative sequence power component, $P^-$ and harmonic frequency components that provide a negative contribution to mechanical power at the axle from a sum of the positive sequence power component, $P^+$, and harmonic frequency components that provide a positive contribution to mechanical power at the axle;

determine a rotor speed, $n_r$, or rotor frequency, $f_r$, of the axle based on data indicative of a load dependent slip, s, and a synchronous speed, $n_s$, or frequency, $f_s$, of the motor;

determine an angular rotor frequency, $\omega_r$, of the axle using the data indicative of the rotor speed, $n_r$, or rotor frequency, $f_r$, of the axle; and determine electromechanical axle torque, $T_{em}$, using the determined electromechanical power, $P_{em}$, and the determined angular rotor frequency, $\omega_r$, wherein the apparatus further comprises one or more components configured to display and/or transmit the determined electromechanical axle torque, $T_{em}$.

15. The apparatus of claim 14, wherein the fundamental and harmonic frequency components of the total electrical active power, P, are obtained by Fourier analysis of total electrical active power, P.

16. The apparatus of claim 14, wherein the positive and negative sequence power components, $P^+$, $P^-$, of the fundamental frequency component, $P_1$, are obtained by symmetrical decomposition of the fundamental frequency component, $P_1$.

17. The apparatus of claim 14, wherein the electromechanical axle torque, $T_{em}$, is determined by calculating $T_{em} = P_{em}/\omega_r$.

* * * * *

UNITED STATES PATENT AND TRADEMARK OFFICE
CERTIFICATE OF CORRECTION

PATENT NO. : 10,712,216 B2
APPLICATION NO. : 14/919547
DATED : July 14, 2020
INVENTOR(S) : Grashof Page 1 of 1

It is certified that error appears in the above-identified patent and that said Letters Patent is hereby corrected as shown below:

On the Title Page

Item (30) Foreign Application Priority Data:
"Oct. 23, 2014 (EP) ...........14199048"
Should read:
--Oct. 23, 2014 (EP) .........14190048--.

In the Claims

Column 8, Claim 7, Line 21:
"of claim 6"
Should read:
--of claim 4--.

Column 8, Claim 14, Line 62:
"P⁻and"
Should read:
--P⁻, and--.

Signed and Sealed this
Ninth Day of February, 2021

Drew Hirshfeld
*Performing the Functions and Duties of the*
*Under Secretary of Commerce for Intellectual Property and*
*Director of the United States Patent and Trademark Office*